United States Patent [19]

Plambeck, Jr.

[11] 4,130,706
[45] Dec. 19, 1978

[54] HYDROPHILIC, OXYGEN PERMEABLE CONTACT LENS

[75] Inventor: Louis Plambeck, Jr., Wilmington, Del.

[73] Assignee: E. I. Du Pont de Nemours and Company, Wilmington, Del.

[21] Appl. No.: 822,719

[22] Filed: Aug. 8, 1977

[51] Int. Cl.² .................. C08F 214/18; G02C 7/04
[52] U.S. Cl. ................. 526/245; 204/159.22; 526/287; 260/29.6 H; 260/29.6 SQ; 351/160 R; 428/520
[58] Field of Search ............. 526/245; 428/520; 351/160; 260/79.3 MU

[56] References Cited

U.S. PATENT DOCUMENTS 3,542,461  11/1970  Girard et al. ............. 526/245
3,950,315  4/1976   Cleaver .................... 526/245

FOREIGN PATENT DOCUMENTS 1302379  1/1973  United Kingdom.

Primary Examiner—Harry Wong, Jr.

[57] ABSTRACT

A contact lens which when saturated with water has oxygen permeability of greater than 500 centibarrers and a receding contact angle with water of less than 35°.

The lens is formed of a polymer containing from 20 to 80 weight percent of repeating units of the structure

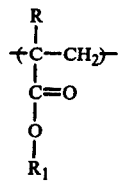

where —R is —H or $CH_3$ and $R_1$ contains from 2 to 10 carbon atoms and at least one polar group. In a preferred aspect —$R_1$ is —$CH_2CH_2OH$ or —$CH_2$-$CHOHCH_3$. The polymer also contains from 80 to 20 weight percent of repeating units of the structure

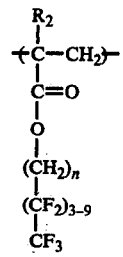

where —$R_2$ is —H or —$CH_3$ and n is 1 to 4.

8 Claims, No Drawings

HYDROPHILIC, OXYGEN PERMEABLE CONTACT LENS

BACKGROUND OF THE INVENTION

The prior art teaches the use of many different polymeric materials in contact lenses. However, although these polymers possess the optical clarity necessary for corrective lenses, they suffer from other characteristics which reduce their potential utility.

Poly(methyl methacrylate) is rigid and durable but relatively impermeable to oxygen. The hydrogel materials based on hydrophilic polymers such as poly (hydroxyethyl methacrylate) are desirably soft but have poor durability because of the relatively weak gel structure. In addition, it is suspected that they provide an environment which is favorable for bacterial growth. Further, such hydrogel materials are relatively impermeable to oxygen unless the water content of the gel is very high.

Silicone rubber is soft and resilient and is highly permeable to oxygen. However, due to the low strength of polysiloxanes, a filler which increases the refractive index of the material must be added to improve the durability.

More recently, contact lenses made from a copolymer of a fluoralkyl acrylic ester and an alkyl acrylate or methacrylate, such as disclosed in Gaylord U.S. Pat. No. 3,808,179, have been developed. These lenses have improved oxygen permeability when compared to lenses formed of poly(methyl methacrylate); and some of them are stated in the patent to be water-wettable.

SUMMARY OF THE INVENTION

The present invention relates to a contact lens which, after being saturated with water, exhibits high oxygen permeability and is completely water wettable, and is flexible to quite soft depending on composition and method of preparation.

DETAILED DESCRIPTION

The present invention relates to contact lenses formed of a copolymer containing from 20 to 80 weight percent, repeating units of the structure

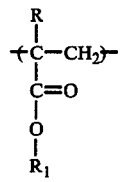

wherein —R is selected from the class consisting of —H and —CH$_3$ and —R$_1$ is a group containing 2 to 10 carbon atoms and containing at least one polar group. Generally, it is preferred that —R be —CH$_3$ because any residual traces of monomer are more irritating when —R is —H. The preferred —R$_1$ is —CH$_2$)$_m$OH wherein m is an integer from 2 to 4. The case where —R$_1$ is —CH$_2$CH$_2$OH is especially preferred.

The copolymer used in the present invention also contains from 80 to 20 weight percent repeating units (R$_f$MA) of the structure

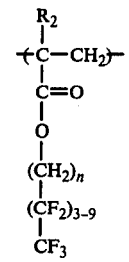

wherein —R$_2$ is selected from the class consisting of —H and —CH$_3$ and n is an integer from 1 to 4. The case where —R$_2$ is —CH$_3$ is preferred. The presence of the —CF$_3$ terminal groups as opposed to a —CF$_2$H terminal group greatly improves the oxygen permeability of the copolymer. Generally, the copolymer will have an oxygen permeability of greater than 500 and up to about 3000 centibarrers which is the permeability of the unmodified fluoropolymer.

An extensive bibliography covering determination of gas permeability of films by various procedures is included in papers by Pye, Hoehn, and Panar, J. Appl. Poly. Sci. 20, 287–301; 1921–1931 (1976), Measurement of Gas Permeability of Polymers.

The polar group in the —R$_1$ groups serves to render the copolymer wettable. The polar group may be —OH, —COOH, —CONH$_2$, —SO$_3$H, etc. The —OH group is preferred since the hydroxylated surface accumulates less proteinaceous debris in the eye than an acidic surface. The —CONH$_2$ group is least preferred because of the biological hazard of any unpolymerized and unremoved amide monomer. The use of an —R$_1$ group carrying more than one polar group is also contemplated. A monomer of this sort would be e.g. glycerol monomethacrylate.

When saturated with water, the copolymer has a receding contact angle with water of less than 35°. It easily remains wettable in the eye since the tear layer spreads more readily than water. For comparison poly(methyl methacrylate) which is known to be adequately wettable in the eye generally has a receding contact angle of about 35°. Thus the upper limit for the receding contact angle for a contact lens is about 35°. The copolymers used herein have contact angles of below 5° up to a R$_f$MA content of about 70%. The contact angle rapidly rises to about 30° at a R$_f$MA content of about 80%. Thus the upper limit of R$_f$MA is 80%. Further at R$_f$MA contents above 80% the polymer is too brittle.

Contact angle measurements are described by Johnson and Dettre p. 115 of Egon Matijevic, Surface and Colloid Science, Wiley-Interscience 1969. It should be pointed out that it is difficult to obtain consistent receding contact angle measurements.

Two polymerization techniques have been used to prepare the copolymers used in the present invention.

The first technique involves thermally initiated copolymerization of solutions of hydroxyethyl methacrylate and perfluoroalkylethyl methacrylate in t-butyl alcohol with e.g. azobis(isobutyronitrile) vinyl polymerization catalyst, followed by isolation of dry polymer, hot pressing of film and hydration of the film by soaking in water.

The second technique involves polymerization-casting of copolymer films from solutions of hydroxyethyl methacrylate, perfluoroalkylethyl methacrylate, and a thermal or photoinitiator in t-butyl alcohol followed by soaking the solvated film to replace the t-butyl alcohol with water.

The first technique was followed for the polymers described in Examples I-III to be described hereinafter. The second technique was employed for the polymers described in Examples IV-VI.

It will be evident from these Examples that the properties of the hydrated hydroxyethyl methacrylate/perfluoroalkylethylmethacrylate copolymers, particularly the all-important property of optical clarity depends on the method of preparation as well as on the composition. Thus, transparent hydroxyethyl methacrylate/perfluoroalkyl ethyl methacrylate (HEMA/$R_f$MA) copolymers in the range of 20/80-60/40 by weight can be prepared by the first technique.

Extension of the first technique to copolymers containing large amounts of hydroxyethyl methacrylate was unsuccessful because the pressed films, although initially transparent, upon hydration wrinkled and shrank and became optically inhomogeneous. This behavior is believed to be due to cross-links in the polymers which result from the presence of a small amount of difunctional ethylene dimethacrylate in the hydroxyethyl methacrylate monomer. The use of pure hydroxyethyl methacrylate, free of difunctional impurities might enable the first technique to be used successfully over the whole range of copolymer compositions.

However, optically clear hydrated films containing large amounts of HEMA (i.e., greater than 50%) can be successfully prepared by the second technique as will be described in Examples IV-VI.

The transparent hydrated polymers containing 50% or more hydroxyethyl methacrylate are soft, flexible and tough with a relatively high water content, and are highly wettable as shown by receding contact angles of less than 5°. The water content and the "limpness" of the polymers increased with increasing hydroxyethyl methacrylate content.

It is desirable that a contact lens have an oxygen permeability of greater than about 500 centibarrers, with above about 1,000 centibarrers being especially desirable. The high oxygen permeability enables the contact lens to be worn for longer periods of time without irritating the eye. Measurement of oxygen permeability gives results indicating the copolymers to have higher permeability than the hydroxyethyl methacrylate homopolymer. Oxygen permeability of the copolymer film is a direct function not only of its fluorine content but also of its water content. The water absorbence of the copolymer is controlled by the concentration of polar groups as well as the method of preparing the film. For example, films prepared by hot pressing show lower oxygen permeabilities than similar compositions polymerized directly into films in the presence of a diluent that provides a film of more extended structure. Generally it is necessary to have at least 20% $R_f$MA in the copolymer in order to have an oxygen permeability of 500 centibarrers.

Because the fluoromonomers generally show poor compatibility with many polar monomers, especially hydroxyl containing monomers, it is impossible to prepare some of the copolymers by a normal bulk polymerization. For example, 2-hydroxyethyl methacrylate is not compatible with the perfluoroalkylethyl methacrylate over the range of compositions of interest and white opaque films result when polymerization is carried out. Clear transparent products can be obtained, however, by polymerizing in solution or by casting a composition containing 10-50% of a compatibilizing diluent such as t-butyl alcohol, butyl Cellosolve ®, etc.

As the molecular weight of the polar monomer increases, compatibility with the fluoromonomer increases. For example, 2-hydroxypropyl methacrylate is more compatible than 2-hydroxyethyl methacrylate. However, from the standpoint of highest oxygen permeability, it is advantageous to use the lowest molecular weight polar monomer since in this way both the weight of fluoromonomer and the weight of polar groups are maximized.

As mentioned hereinbefore, hydroxyl containing monomers generally are contaminated with small amounts (1-3%) of the corresponding diester of methacrylic or acrylic acid. The presence of this material can cause crosslinking and result in insoluble unmoldable products in preparing copolymers with high levels (70-80%) of polar monomer. However, when the composition is cast into the final form (e.g. as in spin casting a lens) the crosslinking monomer may be advantageous since it aids in stabilizing the lens shape.

DESCRIPTION OF THE PREFERRED EMBODIMENTS

The perfluoroalkylethyl methacrylate used in Examples II, III, IV, and V contained essentially 96% by weight of a mixture of perfluorohexylethyl, perfluorooctylethyl, and perfluorodecylethyl methacrylates, the remainder consisting of minor amounts of higher and lower homologs.

EXAMPLE I

A mixture of 232 parts of t-butyl alcohol, 17 parts of commercial 2-hydroxyethyl methacrylate, and 24 parts of an approximately equimolar mixture of perfluorohexylethyl methacrylate and perfluorooctylethyl methacrylate is heated to reflux with stirring in a slow stream of nitrogen to exclude oxygen from the polymerization vessel. As soon as reflux starts (internal temperature 84° C.), 0.05 parts of azobis(isobutyronitrile) polymerization initiator is added. Heating and stirring under reflux are continued for 13 hours during which time three additional 0.05 part portions of the polymerization initiator are added at intervals. The final product (256 parts) is a low viscosity solution containing 14.5% solids corresponding to a yield of 90.5%.

The polymer is isolated by pouring the alcohol solution into water, separating the precipitated solid, and washing it with more water and drying in a 60° C. oven. The dry solid is pressed between aluminum foil or polyimide film at 160°-170° C. to give thin films for examination. A portion of one film is cut into small pieces and heated overnight in a circulating air oven at 100° C. This material is analyzed and found to contain 33.70% fluorine, corresponding to a fluoromonomer content of 57% compared to ca. 59% in the polymerization mixture.

The pressed films of the copolymer are clear and colorless but extremely brittle. However, when such a film is thoroughly soaked in water, it takes up about 10% of its weight and becomes so flexible that the film can be bent double and creased without cracking. A crude hand test on a narrow strip of film shows the tensile strength of the water soaked material to be in the 220-380 lbs/sq inch range. The refractive index of the dry film is 1.438. This drops to 1.428 after soaking in water.

An attempt to determine the oxygen permeability on the dry copolymer film is unsuccessful because the film shatters when it is mounted in the Dow type permeability cell. However, a water soaked film of the material is easily mounted in the cell and the oxygen permeability found to be 1388 centibarrers at 1 psi and 1390 centibarrers at 15 psi pressure. Carbon dioxide permeability is 5020 centibarrers at 1 psi and 4610 at 15 psi pressure.

A standard size contact lens blank ca. ½ inch diameter × 3/16 inch thick is molded from some of the polymer at 150°–200° C. The disk obtained is slightly yellow and has some haze due to dirt inclusions. One surface of the blank is ground and polished to a smooth glossy surface using the polishing agents customarily used with poly(methyl methacrylate) lenses. Because of the brittleness of the dry polymer, preparation of a lens by machining is not attempted. Instead a scleral contact lens is molded from ca. 60 mg of the polymer at 160° C. using a special stainless steel mold coated with a soybean lecithin mold-release agent. The lens obtained has a surface that appears to reproduce the mold well. When the lens is soaked in water, it becomes flexible enough to bend double without cracking or causing any permanent deformation.

A water soaked film of the polymer appears to be very wettable and retained a good surface film of water when withdrawn from water, i.e., receding contact angle of less than 5°.

An acetone solution of the copolymer is coated onto a film of the perfluoroalkylethyl methacrylate/methyl methacrylate copolymer of Cleaver (U.S. Pat. No. 3,950,315) and allowed to dry. When the coated film is soaked in water the surface appears to be very wettable and retains a good film of water when withdrawn from water, indicating a low receding contact angle, i.e., 5° or less. The uncoated Cleaver polymer has a receding contact angle with water of ca. 76° while poly(methyl methacrylate) has a receding contact angle in the 35° range. It is apparent that such a surface treatment makes the highly hydrophobic Cleaver lens equivalent to a poly(methyl methacrylate) lens in wettability.

EXAMPLE II

To a 4neck, 500 ml flask fitted with stirrer, condenser, gas-inlet tube and thermometer is added 10 g (0.077 m) of hydroxyethyl methacrylate, 40 g (0.0829 m) of the perfluoroalkylethyl methacrylate and 285 g (3.85 m) of t-butyl alcohol. While being swept with a stream of nitrogen, the clear colorless solution is heated to reflux after which 50 mg of azobis(isobutyronitrile), a vinyl polymerization catalyst, is added. Stirring with reflux under a blanket of nitrogen is continued for approximately 5½ hours, during which three additional 50 mg portions of azobis(isobutyronitrile), each in 5 ml of t-butyl alcohol, are added at approximately equal intervals. Stirring with reflux under nitrogen is continued for an additional 4 hours. The hot polymer solution is clear and colorless but on cooling to room temperature becomes cloudy and after two days a syrupy insoluble portion separates. At this point the entire reaction mixture is mixed with 1200 ml of water in a 4 liter beaker whereupon the polymer separates as a gummy viscous phase. Steam is passed into the mixture until the odor of t-butyl alcohol can no longer be detected. After cooling, the polymer mass is transferred to a filter, washed with four portions of distilled water and dried to constant weight, first at room temperature and finally in a vacuum oven at 75° C. The dry polymer weighed 42 g (84% yield) and consisted of cream-colored friable lumps.

Transparent, colorless brittle films of the dry polymer are prepared by hot-pressing between films of aromatic polyimide. For example, pressing 3 g of the polymer at 160° C. and a total pressure of 2000 lbs (910 Kg) followed by rapid cooling gives a transparent, brittle film 10 mils (0.254 mm) thick and 3 inches (7.65 cm) in diameter. The hydrated film has a refractive index of $n_D^{23}$ 1.4028 and a receding contact angle of 33° and contains 2.10% $H_2O$.

For measurement of oxygen permability, an 18 mil (0.46 mm) transparent bubble-free film is molded at 160° C. and hydrated by soaking in distilled water at room temperature for 6 days. The transparent hydrated film has an oxygen permeability of 2708 centibarrers.

EXAMPLE III

A solution of 15 g (0.115 m) of hydroxyethylmethacrylate and 35 g (0.073 m) of the perfluoroalkylethylmethacrylate in 285 g of t-butyl alcohol is polymerized by essentially the procedure employed in Example 3, a total of 200 mg of azobis(isobutyronitrile) catalyst being used to promote polymerization. The resulting polymer is isolated from the clear slightly viscous solution as described above in Example 3. The yield is 44.3 g (88.6%) of off-white friable lumps.

Transparent, colorless, brittle films of the dry polymer are prepared by hot pressing between aromatic polyimide films. For example, 3 g of the polymer is molded at 180° C. and a total pressure of 2,000 lbs (910 Kg), followed by rapid cooling to yield 12 mil (0.035 mm) transparent brittle film. The polymer after hydration has a refractive index of $n_D^{25}$ 1.4176, a receding contact angle with water of 27° and a water content of 4.14%.

For measurement of oxygen permeability, a transparent, bubble-free film is molded at 180° and a total pressure of 5,000 lbs (2270 Kg), and hydrated by immersion in water for 6 days. The hydrated film had an average thickness of 17.96 mils (0.0455 mm) and an oxygen permeability of 1646 centibarrers.

EXAMPLE IV

A hydrated film of a hydroxyethyl methacrylate/perfluoroalkylethyl methacrylate copolymer is prepared by photopolymerization of the comonomers and a photo initiator in a cell, followed by exchange of the solvent by water as described below. The comonomer composition consists of a solution containing 9.6 g of hydroxyethyl methacrylate, 2.4 g of the perfluoroalkylethyl methacrylate, 6 g of t-butyl alcohol and 0.12 g of benzoin isobutyl ether photo initiator. The solution is filtered by suction through a glass-frit filter to remove suspended particles and to eliminate dissolved gases. Elimination of gases is essential to prevent bubble formation in the film during polymerization. The solution is used immediately after filtration.

The polymerization cell is constructed from two 6 inch by 6 inch (15.5 cm by 15.5 cm) square glass plates, each having a 6 inch by 6 inch (15.5 cm by 15.5 cm) 5 mil (0.127 mm) fluorinated ethylene propylene copolymer film affixed to one side by means of a thin film of glycerol. A two-layer strip of 0.75 in. by 8.5 mil (19 mm by 0.216 mm) black vinyl electrical tape (total thickness, 17 mils, 0.42 mm) is placed around the periphery of the fluorinated ethylene propylene copolymer film on one plate to form a well and spacer for the polymerization solution. Three channels each about ⅛ inch (3.2 mm) wide are provided through the tape layer on one side to allow gas to escape during filling of the cell. The purpose of the fluorinated ethylene propylene copolymer film liner for the cell is to promote easy release of the copolymer film at the end of the polymerization.

The polymerization cell is filled by pouring a slight excess of the comonomer solution into the well formed by the tape, the other plate placed on top and the two plates clamped together. Care is taken to exclude bubbles during filling. The cell is then suspended in a vertical position and exposed to radiation from two BL 360 fluorescent lamps for 17 hours at room temperature. The resultant alcohol solvated film is readily stripped from the polymerization cell. It is soft and somewhat tacky, transparent and bubble-free with a very slight yellow cast and a thickness of 15.5 mils (0.394 mm). The film is stored in distilled water at room temperature to replace the alcohol with water. The resulting hydrated film is transparent, colorless and limp. It has a refractive index of $n_D^{23}$ 1.4306 and an oxygen permeability of 777 centibarrers. The film is completely wetted by water. It loses 33.39% of its weight when dried at 105° C. in vacuo. Upon rehydration at room temperature, the moisture content of the film is 34.12%.

The data for the foregoing polymer, together with corresponding data for other hydrated hydroxyethyl methacrylate/perfluoroalkylethyl methacrylate copolymer films prepared by polymerization-casting in the same manner is reported in Table 1.

COMONOMER COMPOSITION AND PREPARATION OF SYRUP

The comonomer composition consists of a solution containing 5.0 g of 2-hydroxyethyl methacrylate, 5.0 g of perfluoroalkylethyl methacrylate mixture, 3.3 g of t-butyl alcohol and 0.025 g of benzoin isobutyl ether photoinitiator. The solution is filtered by suction through a glass-frit filter to remove suspended particles, and placed in a bottle closed with a serum cap. Then, by means of hypodermic needles passing through the cap, the solution is, in succession, deoxygenated by bubbling oxygen-free nitrogen through it, and degassed by applying a vacuum to it. Partial polymerization to a clear syrup is then carried out by exposing the solution for 4 minutes to the radiation from an RS sunlamp at a distance of 9–10 inches (23–25 cm).

POLYMERIZATION TO FILM

The clear colorless syrup is then immediately placed in a polymerization cell constructed as described in Example IV. Care is taken to exclude bubbles during filling of the cell. The cell is suspended in a vertical position and exposed to the radiation from two BL 360 lamps at a distance of 6 inches (15 cm) for 17 hours. The resultant t-butyl-alcohol-solvated copolymer film is readily stripped from the cell. It is transparent, colorless, limp and bubble-free, and is 14 mils (0.36 mm) thick. The film is soaked in 3 successive 75 ml portions of absolute ethanol for 20–25 minutes each, to remove

TABLE 1

| Polymer | *HEMA/*R₄MA MONOMER Wt. ratio | Polymerization time hours | Oxygen Permeability Cb | Refractive Index $n_D$(° C) | Water Content % (on rehydration %) | Receding Contact Angle |
|---|---|---|---|---|---|---|
| a | 70/30 | 17 | 743 | 1.4276(23) | 30.29 (30.49) | <5° |
| b | 80/20 | 17 | 777 | 1.4306(23) | 33.39 (34.12) | <5° |
| c | 90/10 | 20 | 363 | 1.4456(25) | 36.64 (38.06) | <5° |
| d | 100/0 | 17 | 165 | | | wettable <5° |

*HEMA - hydroxyethyl methacrylate
*R₄MA - perfluoroalkylethyl methacrylate

In polymers a–c the t-butyl alcohol solvated film produced is transparent, limp, bubble-free, with a very slight yellowish tint and has an ester odor. In polymer d the t-butyl alcohol solvated film produced is transparent, very limp and bubble-free. The copolymer films are readily stripped from the fluorinated ethylene propylene copolymer films. The hydrated films of polymers a and b are transparent, colorless and limp. The hydrated film of polymer c is transparent, tough, limp and has a very slight yellow tint. The hydrated film of polymer d is transparent, soft and very limp. The oxygen permeability, refractive index and contact angles reported in Table 1 are all measured on hydrated films of the copolymers.

EXAMPLE V

A hydrated film of a 50/50 copolymer of 2-hydroxyethyl methacrylate and the perfluoroethyl methacrylate monomer mixture of Example II is prepared by two-stage photopolymerization of a solution of the comonomers and photoinitiator in t-butyl alcohol to form first of all a partially polymerized syrup and then a polymer film, followed by exchange of the solvent by water, as described below.

the butyl alcohol. The film becomes very soft and swollen. The final portion of alcohol containing the film is then gradually diluted with 480 l ml of distilled water over a period of about 23 hours. The film is finally soaked in 2 successive portions of distilled water, and stored under water. It remains transparent throughout, and essentially regains its original dimensions in water, and becomes somewhat stiffer; the final thickness being 13 mils (0.33 mm). The hydrated film has an oxygen permeability of 519 centibarrers and a receding contact angle with water of <5°.

EXAMPLE VI

When 2-hydroxypropyl methacrylate is substituted for the 2-hydroxyethyl methacrylate in the procedure of Example V, a similar film is obtained. However, in this case when a methanol extracted film is treated with water to replace the methanol, the film becomes slightly opalescent. At 25° C. such a film is flexible to a degree but tends to crack when bent double and creased. At 37° C. the film is more resistant to cracking. If the methanol extracted film is allowed to dry without introducing any water the film obtained is clear and free from opalescence and remains clear when placed in water. It absorbs 6–7% by wt of water giving a film that is completely wettable and although almost as stiff as poly(- methyl methacrylate) can be bent double and creased without cracking at 37° C. At 25° C. the film was more brittle.

I claim:

1. A contact lens having a surface formed of a polymer consisting essentially of from 20 to 80 weight percent units of the structure

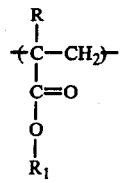

wherein —R is selected from the class consisting of —H and —CH$_3$ and —R$_1$ is a group containing from 2 to 10 carbon atoms which contains at least one polar group selected from the class consisting of —OH, —COOH, —CONH$_2$, and —SO$_3$H, and from 80 to 20 weight percent units of the structure

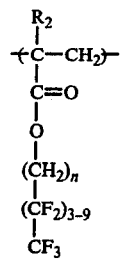

wherein —R$_2$ is selected from the class consisting of —H and —CH$_3$ and n is an integer from 1 to 4, which polymer on being saturated with water has an oxygen permeability of at least 500 centibarrers and a receding contact angle with water of less than 35°.

2. The contact lens of claim 1 wherein the entire lens is formed of the same polymer as the surface.
3. The contact lens of claim 2 wherein —R$_1$ is —(CH$_2$)$_m$—OH and m is an integer from 2 to 4.
4. The contact lens of claim 3 wherein R is CH$_3$.
5. The contact lens of claim 4 wherein R$_2$ is CH$_3$.
6. The contact lens of claim 5 wherein m is 2.
7. The contact lens of claim 6 wherein n is 1.
8. The contact lens of claim 7 wherein n is 2.

* * * * *